(12) United States Patent
Joo et al.

(10) Patent No.: US 7,010,192 B2
(45) Date of Patent: Mar. 7, 2006

(54) OPTICAL FIBER ARRAY BLOCK EMBEDDING OPTICAL DEVICE THEREIN

(75) Inventors: Gwan Chong Joo, Hwasung (KR); Jae Shik Choi, Hwasung (KR); Ki Woo Chung, Hwasung (KR); Do Hoon Kim, Hwasung (KR)

(73) Assignee: Hantech Co., Ltd., Kyungki-do (KR)

( * ) Notice: Subject to any disclaimer, the term of this patent is extended or adjusted under 35 U.S.C. 154(b) by 0 days.

(21) Appl. No.: 10/493,640

(22) PCT Filed: Nov. 6, 2002

(86) PCT No.: PCT/KR02/02063

§ 371 (c)(1),
(2), (4) Date: Apr. 22, 2004

(87) PCT Pub. No.: WO03/040795

PCT Pub. Date: May 15, 2003

(65) Prior Publication Data

US 2004/0264865 A1 Dec. 30, 2004

(30) Foreign Application Priority Data

Nov. 8, 2001 (KR) .................... 10-2001-0069428

(51) Int. Cl.
*G02B 6/26* (2006.01)
*G02B 6/42* (2006.01)

(52) U.S. Cl. ..................... 385/30; 385/14; 385/15; 385/31; 385/42; 385/48; 385/50; 385/88; 385/89

(58) Field of Classification Search ............... 385/24, 385/39, 59, 76, 83, 88–89, 14–15, 30–32, 385/42–43, 48, 50, 92, 115
See application file for complete search history.

(56) References Cited

U.S. PATENT DOCUMENTS

| 3,777,149 A | * | 12/1973 | Marcatili ............... 250/208.6 |
| 4,076,375 A | | 2/1978 | Muska et al. ........... 350/96.15 |
| 4,145,457 A | * | 3/1979 | Kersten .................. 427/526 |
| 4,514,057 A | * | 4/1985 | Palmer et al. ............. 385/30 |
| 4,549,782 A | | 10/1985 | Miller .................. 350/96.16 |
| 4,558,920 A | * | 12/1985 | Newton et al. ............ 385/30 |

(Continued)

FOREIGN PATENT DOCUMENTS

DE 4114629 5/1992

(Continued)

*Primary Examiner*—Frank G. Font
*Assistant Examiner*—Ryan Lepisto
(74) *Attorney, Agent, or Firm*—Frommer Lawrence & Haug LLP; Ronald R. Santucci

(57) ABSTRACT

An optical fiber array block includes at least one optical waveguide having an optical fiber zone, and an optical device. An optical signal leakage window is formed at the optical waveguide, and the optical device corresponds to the optical signal leakage window. If the optical signal leakage window is formed at an optical fiber comprising a core and a clad layer, the clad layer is partially removed or is partially connected to the core by means of an ion implantation technique.

22 Claims, 8 Drawing Sheets

U.S. PATENT DOCUMENTS

| | | | | |
|---|---|---|---|---|
| 4,723,827 | A * | 2/1988 | Shaw et al. | 385/25 |
| 4,900,118 | A * | 2/1990 | Yanagawa et al. | 385/24 |
| 5,042,896 | A * | 8/1991 | Dahlgren | 385/31 |
| 5,101,090 | A | 3/1992 | Coyle, Jr. et al. | 219/121.68 |
| 5,757,989 | A * | 5/1998 | Yoshimura et al. | 385/14 |
| 5,854,864 | A * | 12/1998 | Knoesen et al. | 385/30 |
| 5,892,857 | A | 4/1999 | McCallion | 385/1 |
| 5,903,685 | A * | 5/1999 | Jones et al. | 385/12 |
| 5,909,524 | A * | 6/1999 | Tabuchi | 385/49 |
| 5,966,493 | A * | 10/1999 | Wagoner et al. | 385/140 |
| 6,456,766 | B1 * | 9/2002 | Shaw et al. | 385/47 |
| 6,490,391 | B1 * | 12/2002 | Zhao et al. | 385/30 |
| 6,744,948 | B1 * | 6/2004 | Pi et al. | 385/30 |
| 2001/0026667 | A1 * | 10/2001 | Kawanishi et al. | 385/125 |

FOREIGN PATENT DOCUMENTS

| | | |
|---|---|---|
| EP | 1 008 876 A2 | 6/2000 |
| EP | 1 014 131 A2 | 6/2000 |
| GB | 2 168 165 | 6/1986 |
| JP | 05-297331 A | 11/1993 |
| JP | 11-112065 A | 4/1999 |
| JP | 2001-183552 | 7/2001 |
| WO | WO 00/54377 | 9/2000 |

* cited by examiner

OPTICAL FIBER ARRAY BLOCK EMBEDDING OPTICAL DEVICE THEREIN

This application is a 371 of PCT/KR02/02063 filed on Nov. 6, 2002, published on May 15, 2003 under publication number WO 03/040795 A1 which claims priority benefits from Korean patent application number KR 2001-69428 filed Nov. 8, 2001.

BACKGROUND OF THE INVENTION

1. Field of the Invention

The present invention relates to an optical fiber array block and, more particularly, to an optical fiber array block embedding optical devices such as photodiodes for use in a monitor.

2. Description of the Related Art

Optical circuit devices are widely used in a wavelength division multiplexing (WDM) optical communication system. The optical circuit devices include an arrayed wavelength grating (AWG) device, an arrayed variable optical attenuator (VOA), and so forth. When a WDM optical communication apparatus is practically used in an optical communication system, the intensity of an optical signal transmitted between optical circuit devices is generally varied at each optical fiber channel due to insertion loss resulting from an optical coupling characteristic of each channel, optical wavelength amplifying characteristics, and an optical transmission path difference. In the optical communication system, it is significant that different-intensity optical signals are readjusted to have the uniform intensity so as to correctly transmit the optical signals to multiple channels. For that reason, what is firstly needed is to accurately measure the different intensities of the optical signals.

There are various approaches to measure the intensity of an optical signal in each channel. One of the various approaches is explained with reference to FIG. 1.

As shown in FIG. 1, a tap coupler 15 for dividing an optical signal at a constant ratio is coupled to each optical fiber 13 from an optical circuit device 10 with a horizontal waveguide integrated therein and an optical fiber array block 11. As a light receiving element, a monitor photodiode 19 for detecting the intensity of an optical signal is optically coupled to one end of an optical line 17 branched by a tap coupler 15. The optical signal detected from the photodiode 19 generates photocurrent having a functional relation to the intensity thereof, and is inputted to a control module 23 via an electric wire 21. The optical signal processed in the control module 23 is feedbacked to a controller of the optical circuit device 10 of a previous stage when an optical signal already passed, controlling an attenuation rate of the optical signal.

Unfortunately, the above-described approach encounters a problem. The problem is to necessarily to install a branch coupler and a light receiving element in each channel, and to install a control module to be transmitted to an optical circuit device of a previous stage by processing an electrical signal of the light receiving element. Further, the space for a photo wire connecting them is needed. Therefore, this approach requires a number of parts used for measuring the intensity of the optical signal throughout a number of channels. Since each of the parts has a great volume and their connection structure is very complicated, there is difficulty in integrating devices, used in this approach, in a small-sized module. In conclusion, the process for uniformly controlling the intensity of an optical signal leads to increase in the total volume of an optical communication apparatus as well as complication of a structure and a fabricating process.

SUMMARY OF THE INVENTION

In order to overcome the foregoing disadvantages, the present invention provides an optical fiber array block where a detection module for measuring the intensity of an optical signal to an optical waveguide is integrated and miniaturized in an optical circuit device to facilitate a process for forming an associated device and realize a mass production by way of an automated work.

According to the present invention, an optical fiber array block having an optical waveguide including a space for optical fibers on a board includes leakage windows installed on the optical waveguide, and optical devices arranged corresponding to the leakage window.

The optical waveguide is composed of optical fibers each including a core and a clad layer that are around the leakage window made partially from the clad layer. The optical device is one of a photodiode and a kind of photo receiving device. The optical waveguide is made of an optical fiber array composed of a plurality of optical fibers each being settled in each of grooves formed on the board. The leakage windows are parallel to the optical fiber array along a direction crossing the grooves. The optical devices are arranged along the direction to be spaced with same intervals to each other together with the leakage windows.

The optical fiber array block further comprises an intermediate panel interposed between the substrate and the board, electric terminals connectable to the optical devices on the substrate, guiding holes penetrating the intermediate panel to lead optical signals emitted from the leakage windows to the optical devices, junction pads connected to the electric terminals, electric wires led from the junction pads, and electrode pads positioned at ends of the electric wires.

Also the optical fiber array block further includes an intermediate panel installed on the substrate to electrically connect the substrate to the board, electric terminals connectable to the optical devices on the substrate, junction pads arranged on a bottom side of the intermediate panel and connected to the electric terminals, electric wires led from the junction pads, conductive patterns contacting with the electrode pads when the board joins to the intermediate panel, substrate wires led from the conductive patterns, and wire-bonded electrode pads arranged on a edge surface of the board. The edge surface is out of covering by the intermediate panel.

Also the optical fiber array block further includes fosses formed at boundaries of the block cap to stop spread of glue.

DETAILED DESCRIPTION OF THE INVENTION

A principle of the present invention is explained in detail with reference to FIG. 2, which shows an optical fiber having an optical signal leakage window.

Figure 2:
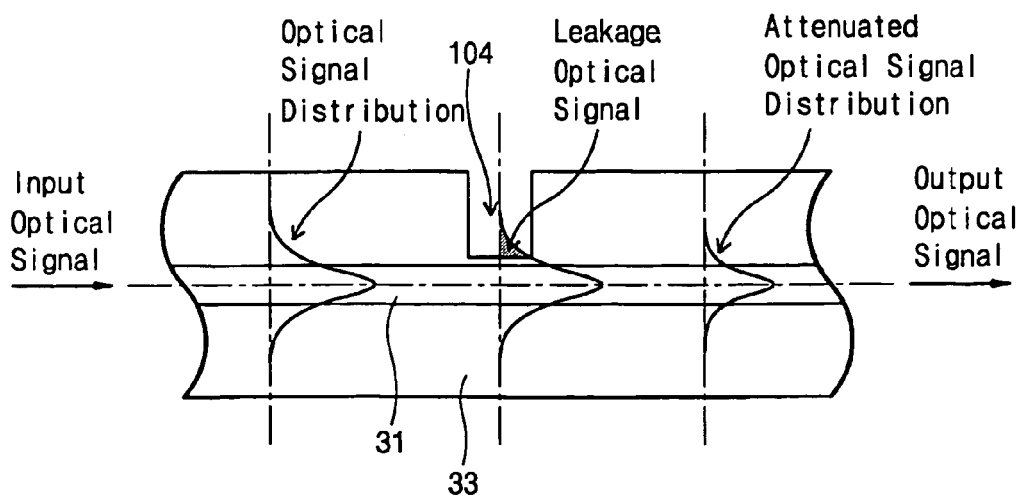
FIG. 2 is a cross-sectional view showing one section of an optical fiber in which an optical signal leakage window is formed according to the present invention.

Referring to FIG. 2, an optical fiber includes a core 31 into which an optical signal passing the optical fiber is almost concentrated, and a clad layer 33 surrounding a periphery of the core 31. Because an optical signal transmitted through the core 31 is totally reflected at a boundary of the clad layer 33, it is almost concentrated into the core 31. An optical signal passing a specific spot at a specific time is concentrated into the core 31, and a distribution state of the optical signal is exhibited by means of the Gaussian distribution centered at the core 31. The clad layer 33 is partially removed at an optical signal leakage window 104, exposing an optical signal passing the window 104 to the exterior of an optical fiber. The total optical signal, which passed the optical signal leakage window 104, is realigned to reestablish the Gaussian distribution. Accordingly, a peak value of the realigned distribution is reduced as compared to a peak value of the Gaussian distribution before passing the optical signal leakage window 104.

Figure 3:
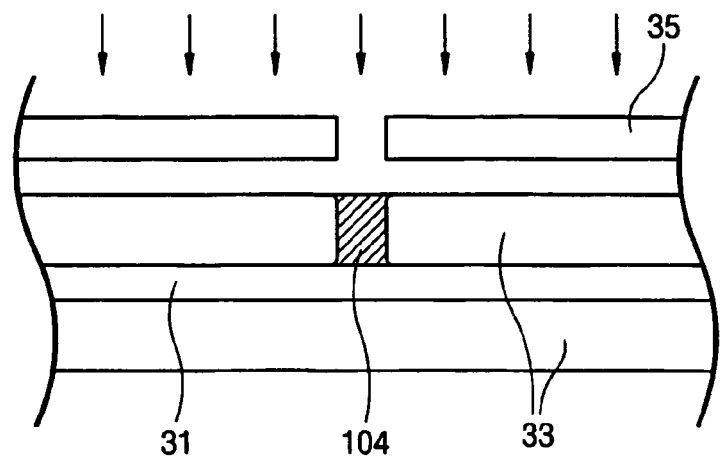
FIG. 3 is a state diagram for explaining the state that the optical signal leakage window according to the invention is formed by an ion implanting process.

An optical leakage window may be formed by implanting impurities into the clad layer 33 using a mask 35 exposing an optical signal portion where the leakage window 104 is to be formed, as shown in FIG. 3. In this case, the impurity-implanted window is connected to the core 31 and a refractive index of the leakage window 104 becomes equal to that of the core 31. Thus, the total reflection of the optical signal is suppressed at the leakage window 104 to leak an optical signal through the leakage window 104.

If a light electric element such as a photodiode is installed at a position opposite to a leakage window, it detects a small optical signal leaked through the leakage window to measure the intensity of an optical signal passing the whole optical fiber. Based on the measurement, optical signal intensities in channels can be compared and controlled.

Meanwhile, if a light element such as a diode is installed thereat, a light produced from an optical device may travel into the optical fiber. By adding or subtracting a pattern of the optical signal in a transmitting part and a receiving part, a security communication may be achieved. In view of this and other advantages, the present invention is suggested.

If an optical fiber array includes a plurality of optical fibers, it is preferable to form optical signal leakage windows having the same size, shape, and refraction characteristic at the optical fibers respectively. It is also preferable that equivalent are the distance and relative position of an optical signal leakage window and a corresponding photodiode as well as the intermediary space of a medium. In conclusion, if optical signal intensities are compared with one another, increase or decrease in optical signal intensity of each channel and other handlings may be carried out through feedback by comparing the relative intensities of optical signals passing optical fibers constituting an array.

(First Embodiment)

Figure 4:
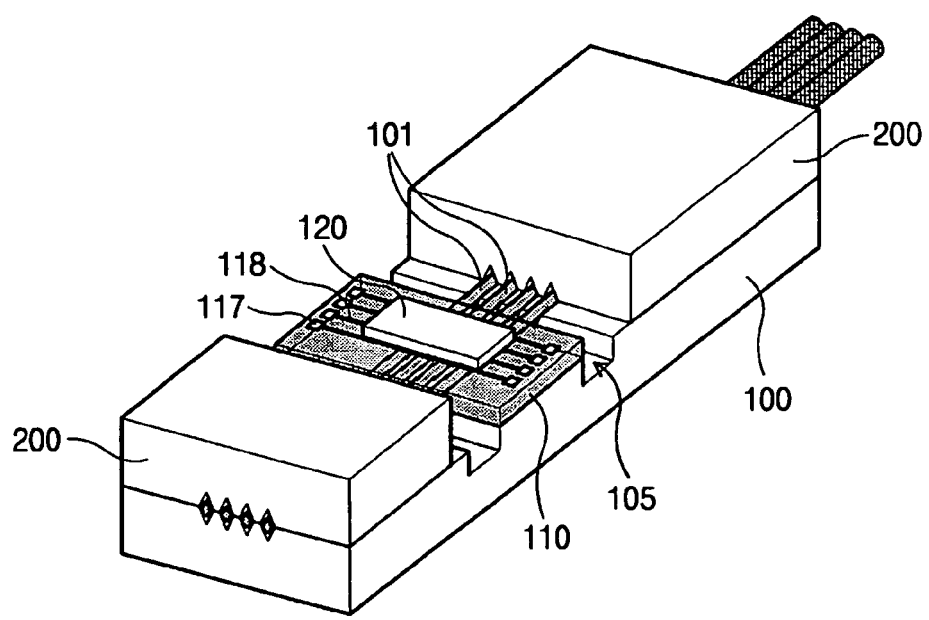
FIG. 4 is a perspective view showing the appearance of an optical fiber array block according to a first embodiment of the invention.

An appearance of an optical fiber array block according to a first embodiment of the invention is illustrated in FIG. 4.

Referring to FIG. 4, a plurality of V-shaped grooves are horizontally formed on a block board 100. An uncoated optical fiber 101 is placed in the respective V-shaped grooves. A block cap 200 corresponding to the block board 100 is disposed on the V-shaped grooves. The block cap 200 is cut predetermined width along the horizontal direction of the groove. Glue-spread-preventing grooves 105 are formed on the block board adjacent to opposite peripheries of a region where the block cap 200 is cut. Between the grooves 105, the block board 100 and the optical fiber are covered with a medium panel 110. An optical device board 120 is disposed in the center of a top surface of the medium panel 110. Electric wires 118 and junction pads 117 are formed on the top surface of the medium panel 110. The junction pads 117 are disposed at ends of the corresponding electric wires 118, respectively.

Figure 5:
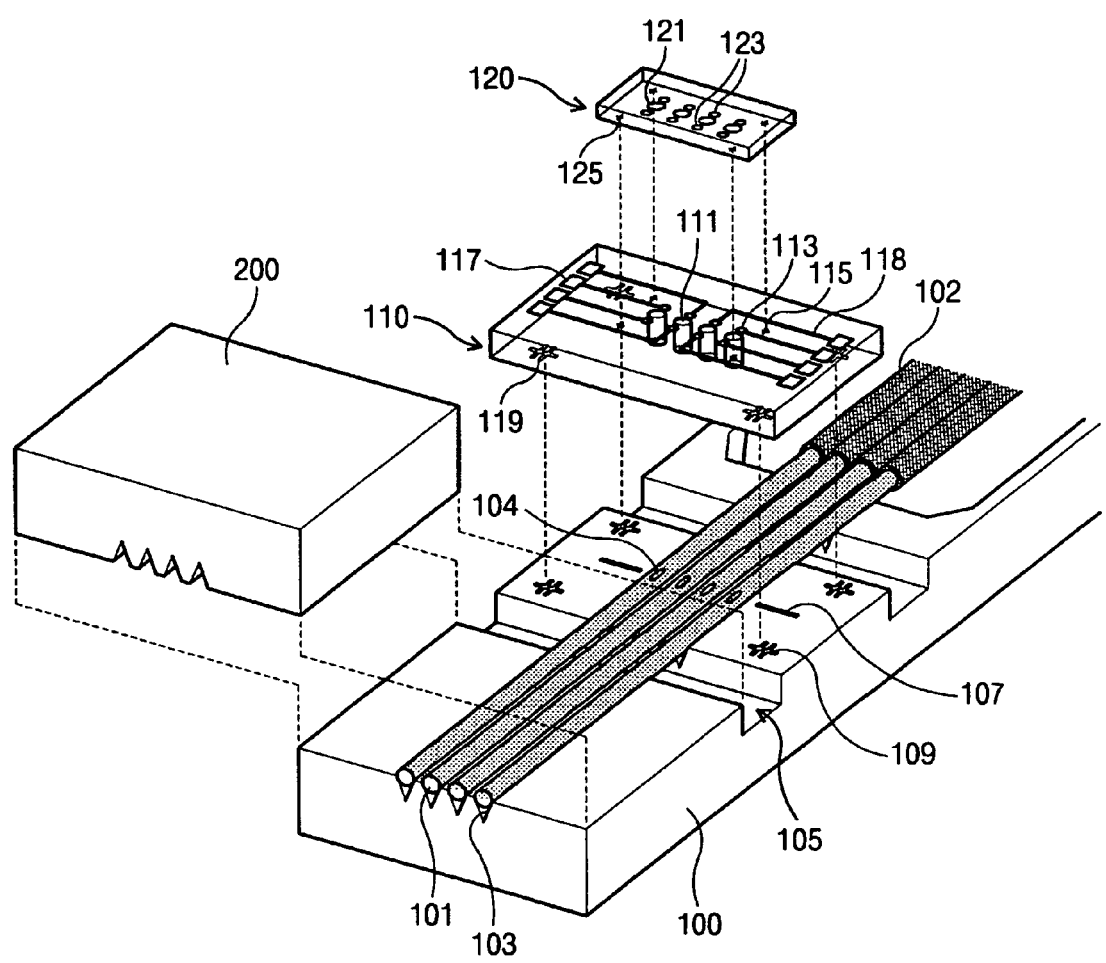
FIG. 5 is an exploded perspective view for explaining a detailed structure of the optical array block shown in FIG. 4 and a method of forming the same.

FIG. 5 is a perspective exploded view for explaining a detailed structure of an optical fiber array block as shown in FIG. 4 and a method of forming the same.

Referring to FIG. 5, the block board 100 is similar to a rectangular parallelepiped block. The block board 100 is made of silicon, glass, pyrex and so forth. A plurality of V-shaped grooves 103 are formed in the center of a top surface of the block board 100 to be perpendicular to a long side of the block board 100. Two grooves 105 for glue spread prevention are formed on the block board 100 to be perpendicular to the V-shaped grooves 103. A section having four edges is defined between the two grooves 105. An alignment mark is formed at the respective edges, and a linear mark representing a position of the optical signal leakage window 104 is formed parallel to the two grooves 105.

Each of the optical fibers 101 constituting an optical fiber array is placed without a protection cover 102. In the optical fiber array, an optical signal leakage window 104 is formed over the optical fiber 101 without the protection cover 102 at a position where the linear mark 107 is formed. The leakage window 104 may be formed by partially cutting the optical fiber 101 or implanting impurities. Accordingly, the parallel leakage windows 104 are disposed at a position of the linear mark 107 throughout the optical fiber array.

On an intermediary panel 110, guiding holes 111 are formed corresponding each of the optical signal leakage windows 104 formed in the optical fiber array. The guiding holes 111 are attached to the block board 100. Therefore, the guiding holes 111 are also disposed parallel to the linear marks 107. Two flip chip junction pads 113 are formed on the intermediary panel 110 so as to drive a photodiode 121, respectively. An electric wire 118 leads to the respective junction pads 113. One end of the electric wire 118 is coupled to a wire bonding electrode pad 117 formed parallel to opposite peripheries of the intermediary panel 110.

An optical device substrate 120 is aligned and attached to a part where the guiding holes 111 are formed. A plurality of photodiodes 121 are formed below the optical device substrate 120 so as to cover the guiding holes 111 formed on the intermediary panel 110. In a case where the photodiode 121 are distant apart from the optical signal leakage window 104 and the optical fibers are closely adjacent to each other, without the guiding hole 111, the intensity of an optical signal traveling into the photodiode 121 becomes low. Further an optical signal, which is leaked at the optical signal leakage window 104 formed in the adjacent optical fiber 101, may affect the photodiode 121 corresponding to another optical signal leakage window 104. In order to prevent the above disadvantage, the guiding hole 111 serves to induce most optical signals, which are leaked from the optical signal leakage window 104, to corresponding photodiodes 121.

Each of the photodiodes 121 is installed to expose two electric connection terminals 123 at both sides thereof. Therefore, the intermediary panel 110 may be attached to an electric connection terminal 123 of the substrate 120 by a flip chip junction technique to solder a connection pad 113. After the intermediary panel 110 and the substrate 120 are attached to make an optical device panel, the guiding hole 111 is covered by a light receiving window of the corresponding photodiode 121. Alignment marks 125 and 115 are formed on a lower side of the substrate 120 and a corresponding upper side of the intermediary panel 110, respectively.

On the upper side of the block board 100, the optical device panel is aligned and attached to an area defined between the two grooves 105 by glue. In order to align the optical device panel, alignment marks 119 matching an alignment mark 109 formed on the defined area are previously formed at corners of the intermediary panel 110. A block cap 200 is attached to the defined area and an external upper side of the two grooves 105 by glue. The two grooves 105 prevent the glue used to attach the block cap 200 from spreading out the defined area and capping the optical signal leakage window 104.

Figure 6:
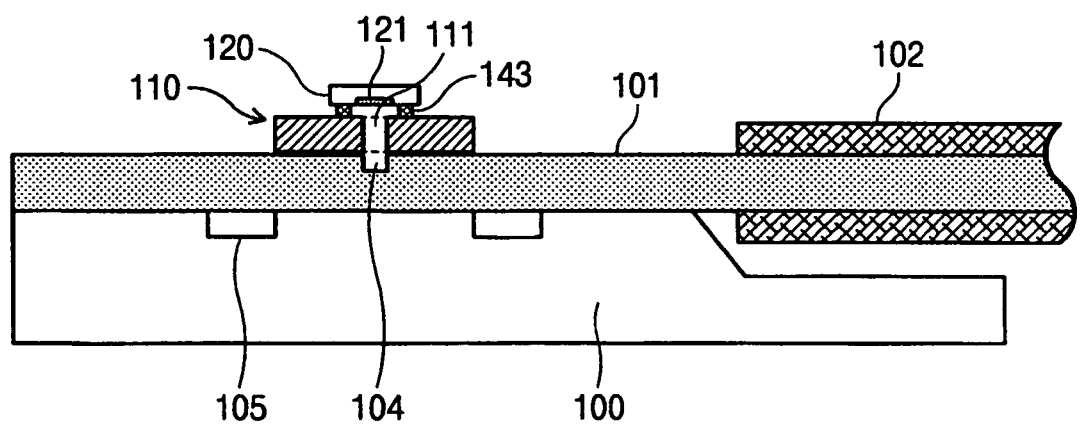
FIG. 6 is a cross-sectional view of the optical fiber array block shown in FIG. 4, taken along an optical fiber.

With reference to FIG. 6, there is illustrated interrelationship of the photodiode 121 of the optical device substrate 120, the optical signal guiding hole 111 of the intermediary panel 110, and the optical signal leakage window 104. Using a manner of controlling a refractive index to enhance a sensing efficiency, a liquid phase material or a solidified material may fill a space between the photodiode 121 and the intermediary panel 110, the optical signal induction pipe 111, an the optical signal leakage window 104. The intermediary panel 110 and the optical device substrate 120 are attached to each other by means of a flip chip junction technique using a solder 143.

(Second Embodiment)

Figure 7:
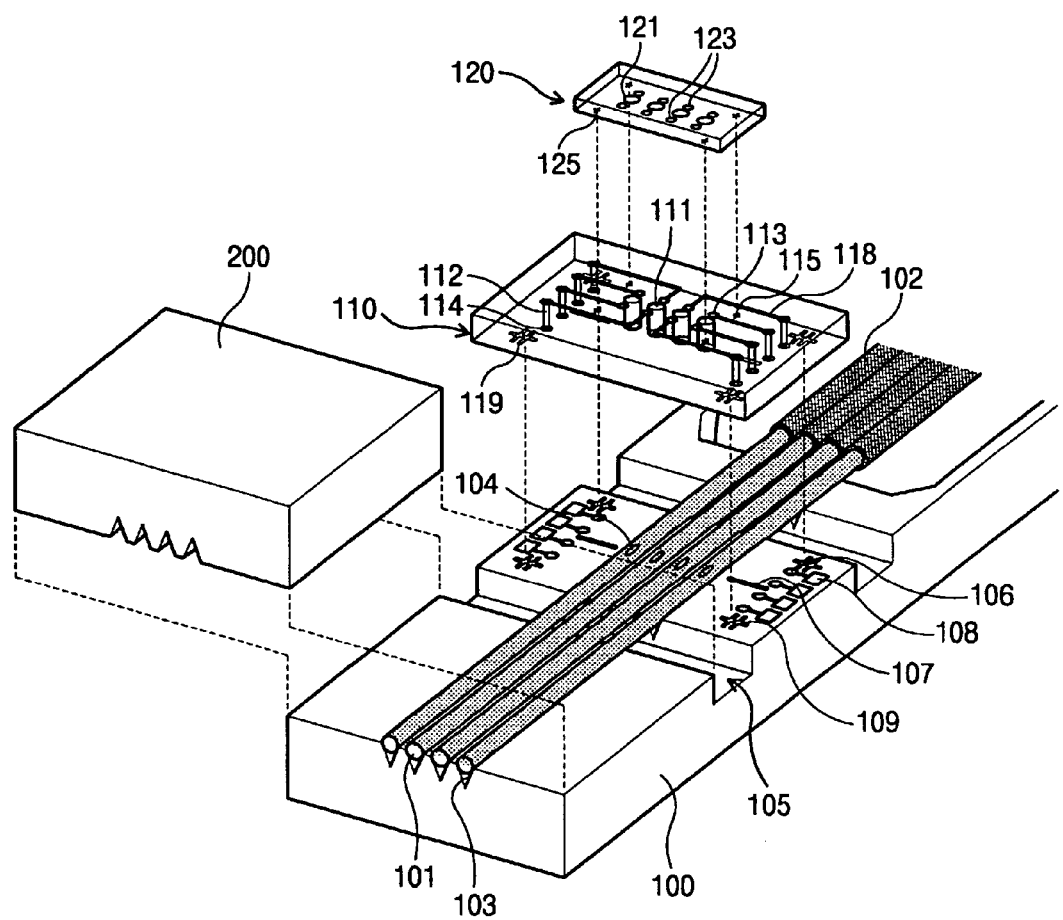
FIG. 7 is an exploded perspective view showing an optical fiber array block substrate on which an electrode pad for wire bonding is formed, according to a second embodiment of the invention.

A second embodiment of the present invention will now be described wit reference to FIG. 7.

The second embodiment is identical to the first embodiment, except that an electric wire 118 is connected to a flip chip junction pad 114 through a via contact 112. The electric wire 118 extends from a flip chip junction pad 113 formed on an intermediary panel 110. When the intermediary panel 110 is aligned and attached to a block board 100, conductive patterns 106 are formed such that the intermediary panel 110 is connected to the flip chip junction pad 114. Each of the conductive patterns 106 is connected to an electrode pad 117 for wire bonding by an electric wire extending to an exterior. Thus, while the wire is connected to the electrode pad 117 formed on the intermediary panel 110 in the first embodiment, the wire is connected to the electrode pad 108 formed on the block board 100 in the second embodiment.

In order to adjust a height of the wire bonding, a height adjusting unit may be installed at a portion where the electrode pad 108 for wire bonding is formed. In this case, there is a step difference between the height adjusting unit and the block board 100.

(Third Embodiment)

A third embodiment of the present invention will now be described with reference to FIG. 8.

Figure 8:
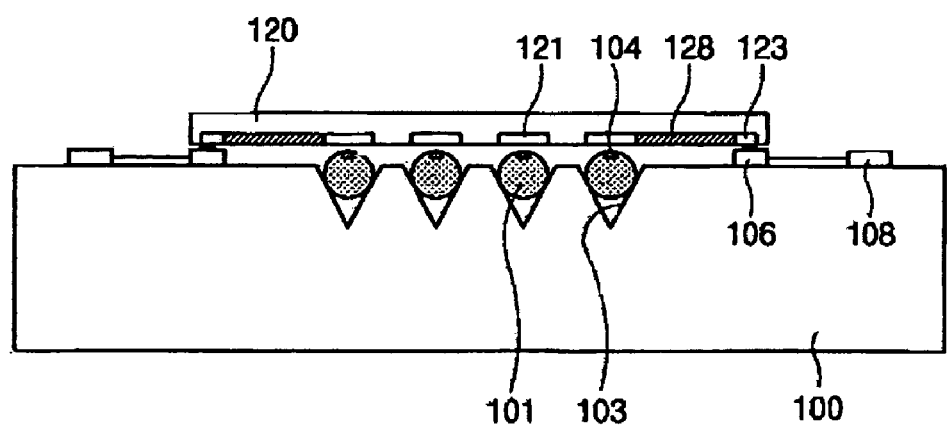
FIG. 8 is a cross-sectional view of an optical fiber array block, vertically taken along the optical fiber forming direction at a position where an optical signal leakage window is formed according to a third embodiment of the invention.

Referring to FIG. 8, an intermediary panel is not used in the third embodiment. A photodiode 121 is formed below an optical device substrate 120. An electric wire 128 and a flip chip junction pad 123 are formed directly beneath the optical device substrate 120, while being formed at the intermediary panel in the prior art. Similar to the second embodiment, when the optical device substrate 120 is aligned and attached to a block board of an optical fiber array block, conductive patterns 106 are formed to connect to the flip chip junction pad 123. Each of the conductive patterns 106 is connected to an electrode pad 108 for wire bonding by an electric wire extending to an exterior.

(Fourth Embodiment)

A fourth embodiment of the present invention will now be described with reference to FIG. 9. Unlike the second embodiment, an optical device substrate is interposed between an intermediary panel and a block board without an optical signal guiding hole and a via contact.

Figure 9:
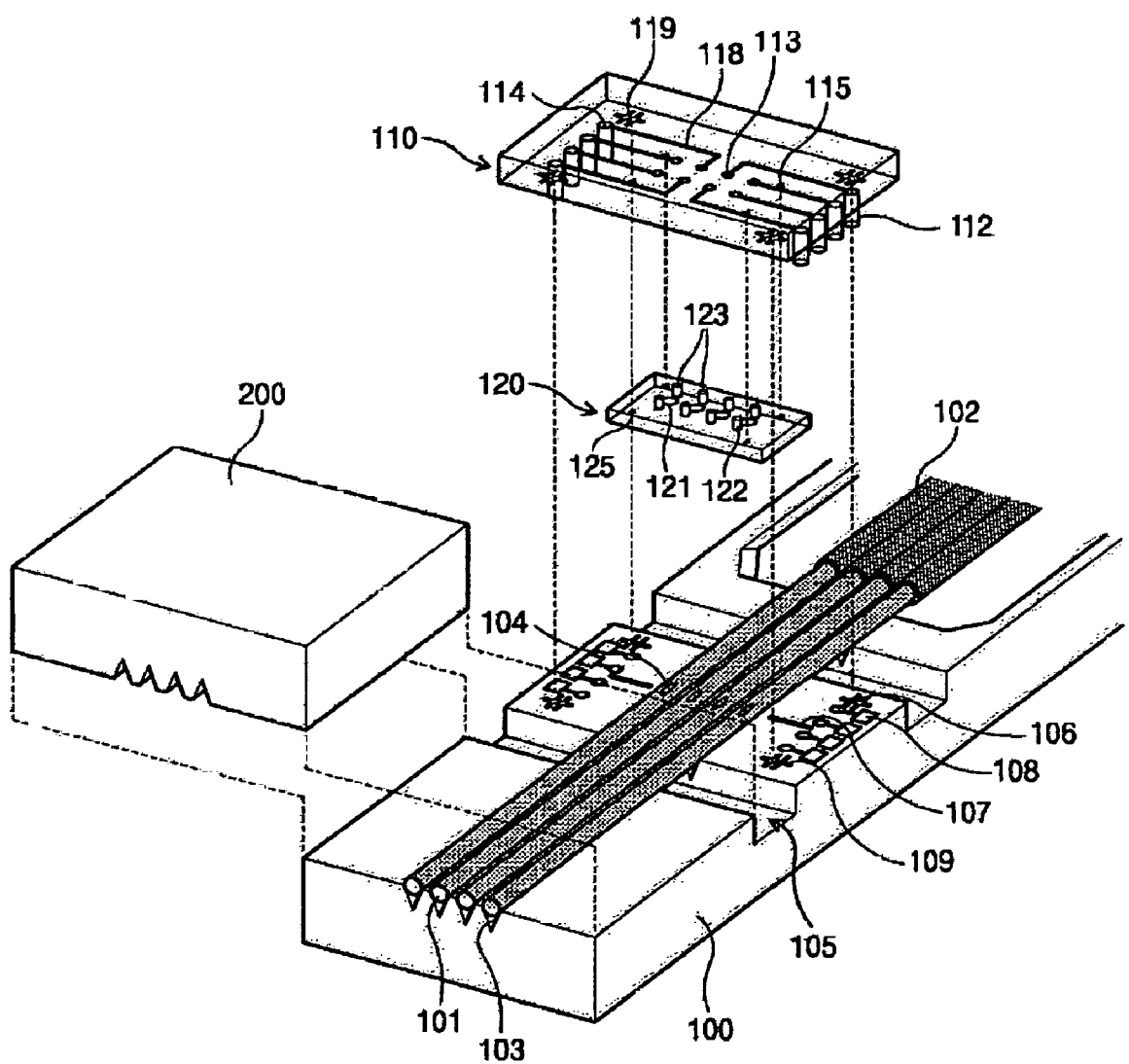
FIG. 9 is an exploded perspective view showing a fourth embodiment of the invention.

Referring to FIG. 9, a height adjusting lid 121 is formed at a flip chip junction pad, so that a space is formed between an intermediary panel 110 and a block board 100. An optical device substrate 120 can be contained in the space. A photodiode 121 is formed on a lower side of the optical device substrate 120 by means of a die bonding technique. A connection terminal 123 is formed on an upper side of the optical device substrate 120 through a contact 222. The connection terminal 123 and the height adjusting lid 121 are aligned and attached to each other based on a flip chip manner. In this case, the photodiode 121 are opposite to an optical signal leakage window 104. The flip chip junction pad is attached to a conductive pad 106 of the block board 100 through the height adjusting lid 121 based on the flip chip manner.

(Fifth Embodiment)

A fifth embodiment of the present invention will now be described with reference to FIG. 10. While the first to fifth embodiments relate to an optical fiber array block that is used in an optical module in the early stage, the fifth embodiment relates to an optical fiber array block that may be used in the exterior of an optical fiber module without a leakage window and an optical device connected thereto.

Figure 10:
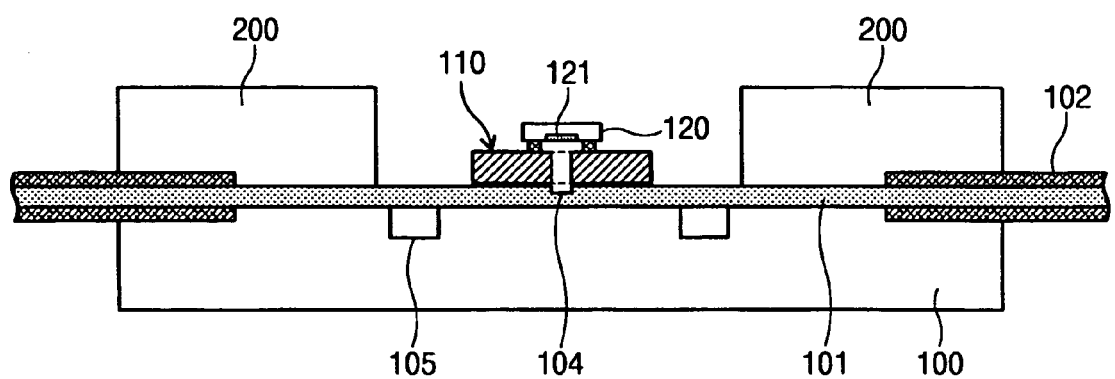
FIG. 10 is an exploded perspective view showing a fifth embodiment of the invention.

Referring to FIG. 10, an optical fiber protection cover 102 is removed at several portions of an optical fiber 101 for forming a separate waveguide in an existing optical circuit. Glue-spread-preventing grooves 105 are preferably formed at a boundary of a block board 100 corresponding to a portion where a block cap 200 is removed. An optical fiber 101 is fixed to a V-shaped groove or in position of the block board 100. In this case, a portion of the optical fiber with the removed prevention cover 102 is located at the block board 100 corresponding to the portion where the block cap 200 is removed. By means of a cutting or ion-implanting technique, an optical signal leakage window 104 is formed at a clad layer of one or more optical fibers that are horizontally arranged. An optical device panel, which comprises a separate optical device or an optical device panel or an optical device substrate 120 and an intermediary panel 110, is aligned and attached to the block board 100 such that a photodiode 121 covers an optical signal leakage window 104 at a position corresponding to the leakage window 104. Each electrode of the optical device may be connected to an eternal electric connection pad that may be formed at an optical device panel or a block board. The electric connection may be done by means of a junction solder, a conductive line, a contact, and so forth. Using glue, the block cap 200 covers the block board 100.

Figure 1:
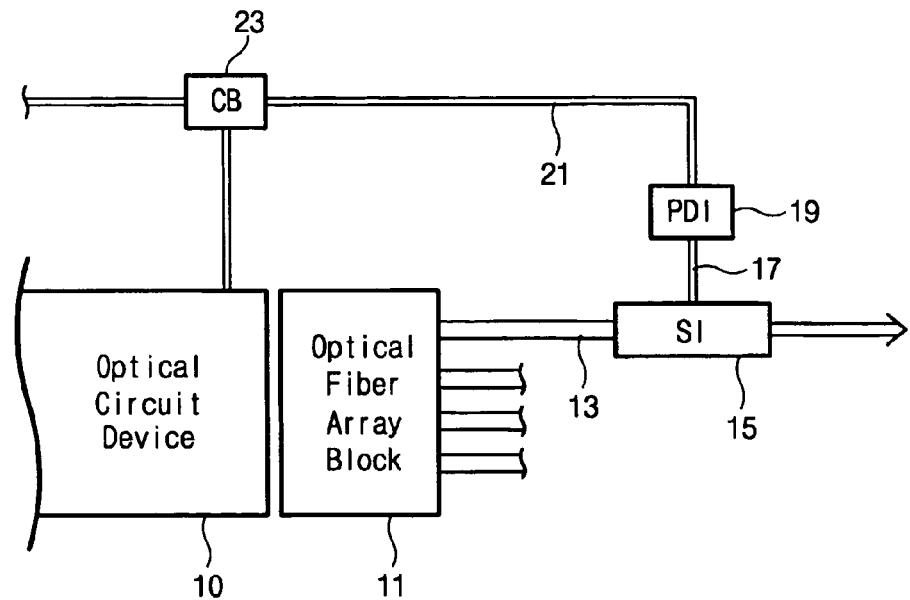
FIG. 1 is a schematic diagram partially showing the structure of a conventional optical circuit for measuring the intensity of an optical signal at each optical waveguide channel.

Although not shown in the figures, a part corresponding to the control module 23 shown in FIG. 1 may be monolithically formed on an upper side of an optical device substrate, an intermediary panel or a block board. As a result, a photodiode direct optical fiber array block having an automatic control function can be fabricated.

According to the present invention, in a case where an optical fiber array type optical signal device used in a wavelength multiple division system detects the intensity of an optical signal, a leakage window is formed at a part of an optical fiber fixed to an optical fiber array block without a separate device such as a branch coupling element. The intensity of the optical signal is correctly detected and measured in the optical signal device. Therefore, it is possible to fabricate an integrated and miniaturized detection module for measuring the intensity of an optical signal of an optical waveguide. Further, it is possible to reduce the installing spaces of many optical devices in receive and transmit terminals of an optical circuit and to facilitate their installment.

What is claimed is:

1. An optical fiber array block, the block comprising:
   an optical waveguide including a plurality of optical fibers, each optical fiber being settled in grooves formed on a board and including, a core, a clad layer and one or more leakage windows;
   one or more optical devices arranged corresponding to the one or more leakage windows;
   an intermediate panel interposed between a substrate where the optical devices are provided and the board; and
   wherein the intermediate panel has one or more guiding hole penetrating the intermediate panel to lead optical signals emitted from the leakage windows to the optical devices.

2. The block of claim 1, wherein the optical device is one of a photodiode and a photo receiving device.

3. The block of claim 1, wherein the leakage windows are parallel to the optical fiber array along a direction crossing the grooves; and wherein the optical devices are arranged in the same direction with the direction in which the leakage windows are arranged, the optical devices being spaced with the same intervals to each other together with the leakage windows.

4. The block of claim 1, wherein the optical devices are formed on a substrate.

5. The block of claim 4, wherein the intermediate panel comprises:
   a plurality of junction pads connected to electric terminals;
   a plurality of electric wires led from the junction pads;
   a plurality of electric pads positioned at ends of the electric wires; and
   wherein the electric terminals are connectable to the optical devices and are formed on the substrate.

6. The block of claim 5, wherein the substrate adheres to the intermediate panel by means of a flip chip joining between the electric terminals and the junction pads.

7. The block of claim 5, wherein the electric terminals are formed on a top side of the intermediate panel, being wire-bonded connectable to external electric wires.

8. The block of claim 5, wherein the junction pads, while formed on a bottom side of the intermediate panel, are connected to conductive patterns through the electric wires by way of via contact holes when the intermediate panel joins to the board, the conductive patterns being electrically connected to wire-bonded electrode pads arranged on an edge surface of the board, the edge surface being out of covering by the intermediate panel.

9. The block of claim 8, wherein conductive patterns are contacted with the junction pads by means of a flip chip joining using a solder balls, so that the board adheres to the intermediate panel.

10. The block of claim 4, wherein alignment marks are inscribed on locations where the substrate and the intermediate panel are opposite to and face each other.

11. The block of claim 4, wherein the substrate includes a module in which the optical devices are associated with processing circuits thereof.

12. The block of claim 4, wherein the intermediate panel is installed on the substrate to electrically connect the substrate to the board;
   a plurality of electric terminals connectable to the optical devices installed on the substrate;
   a plurality of junction pads connected to the electric terminals, electric wire led from the junction pads, and electrode pads forming a termination part of each of the electric wires are arranged on a bottom side of the intermediate panel;
   a plurality of conductive patterns contacting with the electrode pads when the board joins to the intermediate panel, substrate wires led from the conductive patterns, and wire-bonded electrode pads formed on an edge surface of the board are arranged on the substrate; and
   wherein the edge surface being out of covering by the intermediate panel.

13. The block of claim 12, wherein the optical devices are settled on a bottom side of the substrate and the electric terminals are electrically connected to the optical devices through contacts formed in the substrate.

14. The block of claim 1, wherein alignment marks are inscribed on locations where the intermediate panel and the board are opposite to and face each other.

15. The block of claim 1, wherein the one or more guiding holes are filled with a material available for adjusting a refractive index of light.

16. The block of claim 1, further comprising a block cap shielding the optical waveguide while opening regions of the leakage windows.

17. The block of claim 16, further comprising fosses formed at boundaries of the block cap to stop spread of glue.

18. The block of claim 1, wherein the optical waveguide is composed of optical fibers, one end being cut away while the other end being coupled to an optical circuit.

19. The block of claim 1, wherein the optical waveguide is composed of optical fibers, both ends being coupled to an optical circuit.

20. The block of claim 1, further comprising a control module for processing signals generated from the optical devices.

21. An optical fiber array block, the block comprising:

an optical waveguide including a plurality of optical fibers, each optical fiber including a core, a clad layer and one or more leakage windows;

one or more optical devices arranged corresponding to the one or more leakage windows; and an intermediate panel interposed between a substrate where the optical devices are provided and the board;

wherein the intermediate panel has one or more guiding hole penetrating the intermediate panel to lead optical signals emitted from the leakage windows to the optical devices; and wherein each of the leakage windows is formed by partially implanting ions into the clad layer surrounding a periphery of the core along the optical waveguide using a mask, and wherein the leakage window having a refractive index substantially equal to that of the core.

22. An optical fiber array block, the block comprising:

an optical waveguide including a plurality of optical fibers, each optical fiber including a core, a clad layer and one or more leakage windows;

one or more optical devices arranged corresponding to the one or more leakage windows;

an intermediate panel interposed between a substrate where the optical devices are provided and the board; and wherein the intermediate panel has one or more guiding hole penetrating the intermediate panel to lead optical signals emitted from the leakage windows to the optical devices; and wherein the leakage window is formed by partially removing the clad layer surrounding a periphery of the core along the perimeter of the optical waveguide.

* * * * *